United States Patent
Andrews et al.

(10) Patent No.: US 10,143,888 B2
(45) Date of Patent: Dec. 4, 2018

(54) WIRELESS COMMUNICATIONS DEVICE, SYSTEM, AND METHOD FOR IMPROVED ACCURACY IN SPORTS GAME PLAY

(71) Applicants: Craig Andrews, Loudon, TN (US); Judy Andrews, Loudon, TN (US)

(72) Inventors: Craig Andrews, Loudon, TN (US); Judy Andrews, Loudon, TN (US)

(*) Notice: Subject to any disclaimer, the term of this patent is extended or adjusted under 35 U.S.C. 154(b) by 0 days.

(21) Appl. No.: 15/478,167

(22) Filed: Apr. 3, 2017

(65) Prior Publication Data

US 2018/0214743 A1 Aug. 2, 2018

Related U.S. Application Data

(63) Continuation-in-part of application No. 15/418,737, filed on Jan. 29, 2017.

(51) Int. Cl.
*A63B 24/00* (2006.01)
*A63B 71/06* (2006.01)

(52) U.S. Cl.
CPC ...... *A63B 24/0021* (2013.01); *A63B 71/0619* (2013.01); *A63B 2024/0025* (2013.01); *A63B 2024/0028* (2013.01); *A63B 2225/50* (2013.01); *A63B 2225/54* (2013.01)

(58) Field of Classification Search
CPC .......................... A63B 71/06; A63B 24/0021
See application file for complete search history.

(56) References Cited

U.S. PATENT DOCUMENTS

| | | |
|---|---|---|
| 9,035,749 B2 | 5/2015 | Luciano, Jr. |
| 9,339,697 B2 | 5/2016 | Luciano, Jr. |
| 9,370,694 B2 | 6/2016 | Luciano, Jr. |
| 9,498,680 B2 | 11/2016 | Luciano, Jr. |

(Continued)

OTHER PUBLICATIONS

"Fumble? Don't ask the ref. Check the RFID Tag", Paul R. La Monica, CNN Money online, found online at http://money.cnn.com/2016/09/09/technology/nfl-football-zebra-technologies-rfid-tags/, accessed Jan. 7, 2017.

(Continued)

*Primary Examiner* — James S McClellan
*Assistant Examiner* — Kevin Carter
(74) *Attorney, Agent, or Firm* — Crose Law LLC; Bradley D. Crose

(57) ABSTRACT

A system for tracking and monitoring a game ball, wirelessly gathering data from the ball, game elements, players, officials, to improve timeliness and accuracy of game, includes a wireless tag disposed within ball to provide an identification, wirelessly communicable with a receiver to indicate a position in X, Y, Z coordinates, such that ball edge locations are identified; wireless communication system tag reading devices arranged in an array, each configured to sense and read each wireless communication system tag; a pressure sensor disposed upon player and configured to send signal of sudden pressure change; a computer control center connected to the wireless communication system tag and tag reading devices, configured for receiving, computing, processing a plurality of game data and communicating a decisive signal for exact position for placement of ball; and a personal computing device worn by game official for communications and configured to send, receive data during game.

20 Claims, 5 Drawing Sheets

(56) References Cited

U.S. PATENT DOCUMENTS

| | | |
|---|---|---|
| 9,498,682 B2 | 11/2016 | Luciano, Jr. |
| 2005/0143199 A1* | 6/2005 | Saroyan ............. A63B 71/0605 |
| | | 473/438 |
| 2007/0135243 A1 | 6/2007 | LaRue et al. |
| 2007/0184908 A1 | 8/2007 | Hansen |
| 2007/0275787 A1 | 11/2007 | Bouchard |
| 2007/0279494 A1* | 12/2007 | Aman .................... G01S 3/7864 |
| | | 348/169 |
| 2008/0089666 A1* | 4/2008 | Aman ...................... G06K 9/00 |
| | | 386/228 |
| 2008/0312010 A1* | 12/2008 | Marty ................ A63B 24/0003 |
| | | 473/447 |
| 2009/0029806 A1 | 1/2009 | Hsu |
| 2009/0197710 A1 | 8/2009 | Ronda |
| 2010/0134614 A1* | 6/2010 | Aman ................ A63B 24/0003 |
| | | 348/135 |
| 2010/0283630 A1* | 11/2010 | Alonso .................... H04Q 9/00 |
| | | 340/870.11 |
| 2012/0052967 A1 | 1/2012 | Grieshaber |
| 2012/0056721 A1 | 3/2012 | Luciano, Jr. |
| 2012/0255998 A1 | 10/2012 | Luciano, Jr. |
| 2012/0255999 A1 | 10/2012 | Luciano, Jr. |
| 2012/0256731 A1 | 10/2012 | Luciano, Jr. |
| 2013/0165261 A1 | 6/2013 | Luciano, Jr. |
| 2013/0196787 A1 | 8/2013 | Luciano, Jr. |
| 2013/0196788 A1 | 8/2013 | Shimizu |
| 2015/0149837 A1* | 5/2015 | Alonso .............. G06K 7/10227 |
| | | 714/57 |
| 2015/0297949 A1* | 10/2015 | Aman ............... G06F 17/30781 |
| | | 348/157 |
| 2016/0045810 A1* | 2/2016 | Minkovitch ....... A63B 71/0669 |
| | | 348/157 |
| 2016/0103220 A1* | 4/2016 | Ramsaran ............... G01S 15/66 |
| | | 702/182 |
| 2017/0189753 A1* | 7/2017 | Polifka .............. A63B 24/0021 |

OTHER PUBLICATIONS

"The NFL RFID-Tags Its Footballs", RFID Journal, Claire Swedberg, found online at http://www.rfidjournal.com/articles/pdf?14942, accessed online, Jan. 7, 2017.

"How RFID Chips Are Changing the NFL", Forbes online, Aaron Tilley, http://www.forbes.com/sites/aarontilley/2016/02/06/how-rfid-chips-are-changing-the-nfl/print/, accessed online, Jan. 7, 2017.

"RFID Drafted to Track NFL Players' Every Move During Games", RFID Journal, Beth Bacheldor, found online at http://www.rfidjournal.com/articles/view?12068, accessed online, Jan. 28, 2017.

"The NFL's Next Generation Statistics", RFID Journal, Mark Roberti, found online at http://www.rfidjournal.com/articles/view?12839, accessed online, Jan. 28, 2017.

* cited by examiner

WIRELESS COMMUNICATIONS DEVICE, SYSTEM, AND METHOD FOR IMPROVED ACCURACY IN SPORTS GAME PLAY

CROSS-REFERENCE TO RELATED APPLICATION(S)

The present non-provisional patent application is a continuation-in-part application that claims the benefit of priority of U.S. Non-Provisional patent application Ser. No. 15/418,737, which is entitled "WIRELESS COMMUNICATIONS DEVICE, SYSTEM, AND METHOD FOR IMPROVED ACCURACY IN SPORTS GAME PLAY", which was filed on Jan. 29, 2017, and which is incorporated in full by reference herein.

FIELD OF THE INVENTION

The technology described herein relates generally to methods, systems, and devices for analysis of athletic competitions. More specifically, this technology relates to methods, systems, and devices to track location and movement over time of a game ball and game players during a game for improved accuracy, as well as pressure sensors for use on players. Furthermore, this technology relates to methods, systems, and devices to wirelessly gather data from a game ball, a multiplicity of pressure sensors on players, in helmets, and in shoes, players, a referee personal computing device, a game clock, a game whistle, and a game video recordation and replay system in a central computing system, thereby to improve timeliness and accuracy of the athletic competition. Still furthermore, this technology relates to real-time location systems and the utilization of a wireless communication array.

BACKGROUND OF THE INVENTION

In various athletic competitions, sporting events, ball games, and the like, visual knowledge about the location of a game ball, or other like device, and of one or more players engaged in the game may be critical to a referee decision about the game. Game aspects such as fouls, an out-of-bounds ball, location at which to place a ball for a next play, and scoring are all often solely decided based on human, instantaneous, visual inspection and review by a referee or umpire, and perhaps sometimes review of a video replay. As is well known in such competitions, there is much room for visual error, misjudgment, missed plays, bad calls, misplaced balls, and so forth. Such errors may lead to a change in the overall scoring outcome of the game or some other unfairness to one player or one team in the game or event.

By way of example, in some cases even when an official is fully engaged and paying attention in a game, his visual line of sight may be obstructed due to other players, body parts, bad viewing angles, and so forth. Also, by way of example, and regarding football, even an inch can make a difference in a game. Football has often been called a "game of inches." So much so that inch may make a difference between a win and a loss in a game. For example, in football, possession of the ball can change based on a single inch, depending on the location of the completion of the prior play. Knowledge about where to place a ball after a play is critical. Knowledge about when a player hits the ground, steps out of bounds, or makes contact with his helmet is also critical to know as well. Known attempts to address these and related problems are enumerated below. However, there remain many shortcomings and deficiencies in the known prior art.

Related utility patents known in the art include the following:

U.S. Pat. No. 9,498,682, issued to Luciano, Jr. et al. on Nov. 22, 2016, discloses an RFID embedded within inner core of a multi-core golf ball.

U.S. Pat. No. 9,498,680, issued to Luciano, Jr. et al. on Nov. 22, 2016, discloses a split inner core of a multi-core golf ball with RFID.

U.S. Pat. No. 9,370,694, issued to Luciano, Jr. et al. on Jun. 21, 2016, discloses a golf ball with RFID inlay in a molded impression.

U.S. Pat. No. 9,339,697, issued to Luciano, Jr. et al. on May 17, 2016, discloses an RFID golf ball target system and method.

U.S. Pat. No. 9,035,749, issued to Luciano, Jr. et al. on May 19, 2015, discloses a movable golf range target with RFID ball identifier.

Related utility patent application publications known in the art include the following:

U.S. Patent Application Publication No. 2013/0196787 filed by Luciano, Jr. et al. and published on Aug. 1, 2013, discloses an RFID embedded within the inner core of a multi-core golf ball.

U.S. Patent Application Publication No. 2013/0165261 filed by Luciano, Jr. et al. and published on Jun. 27, 2013, discloses a split inner core of a multi-core golf ball with RFID.

U.S. Patent Application Publication No. 2012/0256731 filed by Luciano, Jr. et al. and published on Oct. 11, 2012, discloses a golf ball with RFID in a molded impression.

U.S. Patent Application Publication No. 2012/0255999 filed by Luciano, Jr. et al. and published on Oct. 11, 2012, discloses a golf ball with encapsulated RFID chip.

U.S. Patent Application Publication No. 2012/0255998 filed by Luciano, Jr. et al. and published on Oct. 11, 2012, discloses a golf ball with RFID inlay between a split core.

U.S. Patent Application Publication No. 2012/0056721 filed by Luciano, Jr. et al. and published on Mar. 8, 2012, discloses a moveable golf range target with RFID ball identifier.

U.S. Patent Application Publication No. 2013/0196788 filed by Shimizu et al. and published on Aug. 1, 2013, discloses a golf ball with RFID system.

U.S. Patent Application Publication No. 2012/0052967 filed by Grieshaber et al. and published on Mar. 1, 2012, discloses an RFID golf ball target system and method.

U.S. Patent Application Publication No. 2007/0184908 filed by Hansen and published on Aug. 9, 2007, discloses virtual bowling with a bowling ball having an RFID tag.

U.S. Patent Application Publication No. 2007/0275787 filed by Bouchard et al. and published on Nov. 29, 2007, discloses a bowling ball having an RFID tag.

U.S. Patent Application Publication No. 2009/0197710 filed by Ronda and published on Aug. 6, 2009, discloses a marking system for sport areas.

U.S. Patent Application Publication No. 2009/0029806 filed by Hsu and published on Jan. 29, 2009, discloses a method of applying RFID in a ball game field/court to assist referee in making a decision.

U.S. Patent Application Publication No. 2007/0135243 filed by LaRue et al. and published on Jun. 14, 2007, discloses an active sports tracker and method.

Related non-patent literature (NPL) publications known in the art include the following:

"Fumble? Don't ask the ref. Check the RFID Tag", by Paul R. La Monica, CNN Money online, found online at http://money.cnn.com/2016/09/09/technology/nfl-football-zebra-technologies-rfid-tags/, accessed Jan. 7, 2017.

"The NFL RFID-Tags Its Footballs", FRID Journal, by Claire Swedberg, found online at http://www.rfidjournal.com/articles/pdf?14942, accessed online, Jan. 7, 2017.

"How RFID Chips Are Changing The NFL", Forbes online, by Aaron Tilley, http://www.forbes.com/sites/aarontilley/2016/02/06/how-rfid-chips-are-changing-the-nfl/print/, accessed online, Jan. 7, 2017.

"RFID Drafted to Track NFL Players' Every Move During Games", RFID Journal, Beth Bacheldor, found online at http://www.rfidjournal.com/articles/view?12068, accessed online, Jan. 28, 2017.

"The NFL's Next Generation Statistics", RFID Journal, Mark Roberti, found online at http://www.rfidjournal.com/articles/view?12839, accessed online, Jan. 28, 2017.

As should be apparent to one of ordinary skill in the art, upon reading this disclosure, these many known attempts to address such problems on accuracy in athletic competitions includes many shortcomings and deficiencies.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a system, method, and device to wirelessly gather data from a game ball, pressure sensors, players, a referee personal computing device, a game clock, a game whistle, and a game video recordation and replay system in a central computing system, and a real-time location system utilizing a wireless communication array, thereby to improve timeliness and accuracy of the athletic competition.

In one exemplary embodiment, the technology described herein provides a sport tracking system for tracking and monitoring movement of a game ball in play in a sport game and wirelessly gathering data from the game ball and from other game device elements, game players, and game officials, to improve timeliness and accuracy of the athletic competition. The sport tracking system includes: a game ball; at least one wireless communication system tag disposed within the game ball to provide the game ball with a unique identification and wirelessly communicable with a receiver, reading device to indicate an exact position of the game ball at all times of the game in X, Y, Z coordinates, with X an axis of advancement down a field of play, with Y an axis of side-to-side location on the field of play, and with Z an axis of height of the game ball above a ground level, and to indicate the exact position relative to an edge of the game ball such that game ball edge locations are identified; a plurality of wireless communication system tag reading devices arranged in an array with real time location in decisive areas throughout an area of play for the game, and each configured to sense and read each wireless communication system tag; at least one wireless communication player tag disposed upon an apparel or headwear item of a game player at a specific predetermined point to provide the real-time location date of that predetermined point during the game to provide that point with a unique identification and wirelessly communicable with the receiver, reading device to indicate an exact position of the predetermined point at all times of the game in X, Y, Z coordinates, with X an axis of advancement down a field of play, with Y an axis of side-to-side location on the field of play, and with Z an axis of height above a ground level; at least one pressure sensor disposed upon a player of the game and configured to send a signal of a sudden pressure change, thereby to indicate an impact of a portion of the player or player equipment with the ground or another player; a computer control center on a network and having at least one server and at least one processor, and at least one means for data storage, and connected to the at least one wireless communication system tag disposed in the game ball, the at least one pressure sensor disposed upon a player of the game, and to the plurality of wireless communication system tag reading devices, and configured for receiving, computing, and processing a plurality of game data and communicating a decisive signal for the exact position for a placement of the game ball; and a personal computing device worn and maintained by a game official to officiate the game, wherein the personal computing device is connected to the computer control center for communications and configured both to send and receive data during the game.

In at least one embodiment of the sport tracking system, the system includes a game clock coupled to the computer control center. The exact position of the game ball at all times of the game in X, Y, Z coordinates is collected over time for the duration of a game and paired to a time on the game clock. The exact position is known at a time on the game clock to a level of accuracy at least to hundredths of seconds.

In at least one embodiment of the sport tracking system, the system includes a video camera recordation system coupled to the computer control center and coupled to the game clock. The exact position of the game ball at all times of the game in X, Y, Z coordinates is collected over time for the duration of a game and paired to a time on the game clock is also correlated to the appropriate time on the video camera recordation system.

In at least one embodiment of the sport tracking system, the personal computing device worn and maintained by a game official to officiate the game is also calibrated and synchronized by the computer control center with the game clock and the video camera recordation system.

In at least one embodiment of the sport tracking system, the personal computing device worn and maintained by a game official to officiate the game further comprises real time location based information such that the computer control center correlates with ball location and the game official adds or subtracts penalties from the personal computing device.

In at least one embodiment of the sport tracking system, the system includes a sensor disposed within the game ball to provide a qualitative or quantitative assessment in regard to one or more attributes of the game ball.

In at least one embodiment of the sport tracking system, the sensor is a pressure sensor that in real-time continuously monitors the pressure of the game ball.

In at least one embodiment of the sport tracking system, the system includes a game whistle coupled to the computer control center and coupled to the game clock. The actuation of the game whistle at a given point in time when a game official makes a call is correlated with the game clock such that the exact time and thereby the exact location of the game ball at that time are known.

In at least one embodiment of the sport tracking system, the at least one pressure sensor disposed upon a player of the game is disposed on a player helmet.

In at least one embodiment of the sport tracking system, the at least one pressure sensor disposed upon a player of the game is disposed on a player shoe.

In at least one embodiment of the sport tracking system, the at least one pressure sensor disposed upon a player of the game is disposed on a player knee.

In at least one embodiment of the sport tracking system, the at least one pressure sensor disposed upon a player of the game is disposed on a player butt.

In at least one embodiment of the sport tracking system, the at least one pressure sensor disposed upon a player of the game is disposed on a player back.

In at least one embodiment of the sport tracking system, the at least one pressure sensor disposed upon a player of the game is disposed on a player elbow.

In at least one embodiment of the sport tracking system, the at least one pressure sensor disposed upon a player of the game is disposed on a player shoulder.

In at least one embodiment of the sport tracking system, the at least one pressure sensor further comprises a plurality of sensors disposed upon a player of the game.

In at least one embodiment of the sport tracking system, the at least one wireless communication system tag is RFID.

In at least one embodiment of the sport tracking system, the at least one wireless communication system tag is Wi-Fi.

In at least one embodiment of the sport tracking system, the at least one wireless communication system tag is ultra-wideband (UWB).

In another exemplary embodiment, the technology described herein provides a sport tracking method for tracking and monitoring movement of a game ball in play in a sport game and wirelessly gathering data from the game ball and from other game device elements, game players, and game officials, to improve timeliness and accuracy of the athletic competition. The method includes: utilizing a game ball; utilizing at least one wireless communication system tag disposed within the game ball to provide the game ball with a unique identification and wirelessly communicable with a receiver, reading device to indicate an exact position of the game ball at all times of the game in X, Y, Z coordinates, with X an axis of advancement down a field of play, with Y an axis of side-to-side location on the field of play, and with Z an axis of height of the game ball above a ground level, and to indicate the exact position relative to an edge of the game ball such that game ball edge locations are identified; utilizing at least one wireless communication player tag disposed upon an apparel or headwear item of a game player at a specific predetermined point to provide the real-time location date of that predetermined point during the game to provide that point with a unique identification and wirelessly communicable with the receiver, reading device to indicate an exact position of the predetermined point at all times of the game in X, Y, Z coordinates, with X an axis of advancement down a field of play, with Y an axis of side-to-side location on the field of play, and with Z an axis of height above a ground level; utilizing at least one pressure sensor disposed upon a player of the game and configured to send a signal of a sudden pressure change, thereby to indicate an impact of a portion of the player or player equipment with the ground or another player; utilizing a plurality of wireless communication system tag reading devices arranged in in an array with real time location in decisive areas throughout an area of play for the game, and each configured to sense and read each wireless communication system tag; utilizing a computer control center on a network and having at least one server and at least one processor, and at least one means for data storage, and connected to the at least one wireless communication system tag disposed in the game ball and to the plurality of wireless communication system tag reading devices, and configured for receiving, computing, and processing a plurality of game data and communicating a decisive signal for the exact position for a placement of the game ball; utilizing a personal computing device worn and maintained by a game official to officiate the game, wherein the personal computing device is connected to the computer control center for communications and configured both to send and receive data during the game; implementing the wireless communication system tag such that the exact location of the ends of the game ball are identifiable and the X, Y, Z coordinates; determining an exact location on a game playing area where the game ball resides in X, Y, Z coordinates; utilizing the computer control center to link X, Y, Z coordinates over time; and displaying in the personal computing device worn and maintained by a game official game updates, ball placement locations, as determined by the computer control center.

In at least one embodiment of the sport tracking method, the method also includes: utilizing a game clock coupled to the computer control center; wherein the exact position of the game ball at all times of the game in X, Y, Z coordinates is collected over time for the duration of a game and paired to a time on the game clock; and wherein the exact position is known at a time on the game clock to a level of accuracy at least to hundredths of seconds; and correlating the exact position of the game ball at all times of the game in X, Y, Z coordinates over time of the game clock.

In at least one embodiment of the sport tracking method, the method also includes: utilizing a video camera recordation system coupled to the computer control center and coupled to the game clock; and wherein the exact position of the game ball at all times of the game in X, Y, Z coordinates is collected over time for the duration of a game and paired to a time on the game clock is also correlated to the appropriate time on the video camera recordation system; and correlating the video camera recordation system and game replays with the game clock.

Advantageously, the technology described herein provides a system, method, and device to wirelessly gather data from a game ball, pressure sensors, players, a referee personal computing device, a game clock, a game whistle, and a game video recordation and replay system in a central computing system, thereby to improve timeliness and accuracy of the athletic competition. This greatly improves accuracy, timeliness, and good sportsmanship in games.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a system, method, and device to wirelessly gather data from a game ball, players, multiple pressure sensors, a referee personal computing device, a game clock, a game whistle, and a game video recordation and replay system in a central computing system, thereby to improve timeliness and accuracy of the athletic competition.

By way of example, one athletic competition in which the disclosed innovation is utilized is football. Football has often been called "the game of inches". An inch can mean the difference between a win and a loss. Possession changes based on an inch. Yet, the accuracy of calls is based on instantaneous judgement and sometimes video replays. An objective of this invention is to increase the accuracy of calls significantly. Other aspects of the game can also result in mistakes which result in an error which can change the outcome without people being aware. Each play, the referee must look to the sideline and replace the ball after an incomplete pass. The same is true when there is a penalty. Each time, the referee is judging where a pole is 20 to 50 yards away and trying to duplicate that position within a half inch. Overtime, errors occur which can have game implications. Another common time for errors is when a ball is hidden from view, but the player's knee can be seen. Where was the ball when the knee touched? Video replays cannot tell where the ball was, but can see only the knee.

Figure 1:
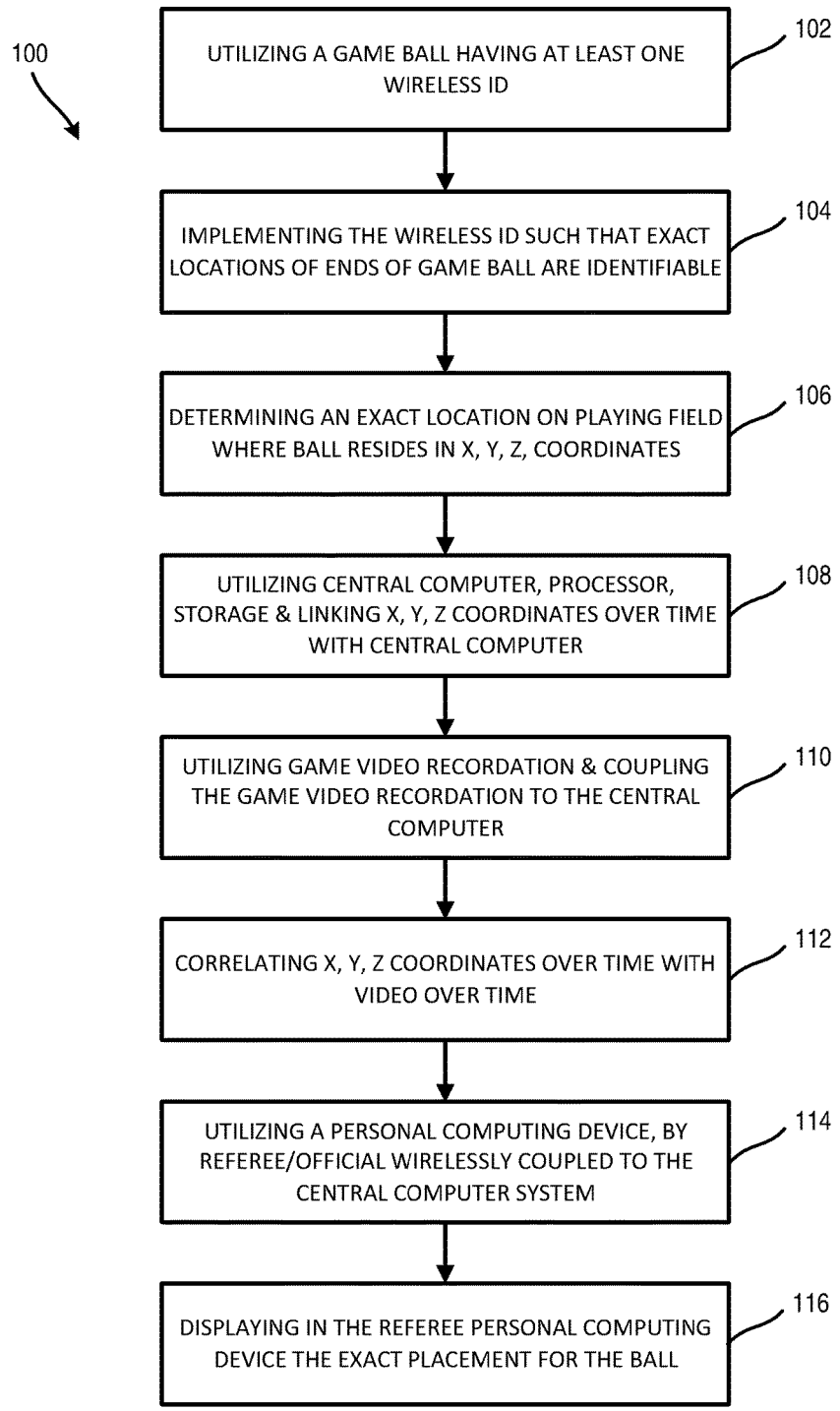
FIG. 1 is a flowchart diagram depicting a method and various method steps to wirelessly gather data from a game ball, players, a referee personal computing device, a game clock, a game whistle, and a game video recordation and replay system in a central computing system, thereby to improve timeliness and accuracy of the athletic competition, according to an embodiment of the technology described herein.

Referring now to FIG. 1, a flowchart diagram 100 depicts a method and various method steps to wirelessly gather data from a game ball, players, a referee personal computing device, a game clock, a game whistle, and a game video recordation and replay system in a central computing system, thereby to improve timeliness and accuracy of the athletic competition.

Figure 2:
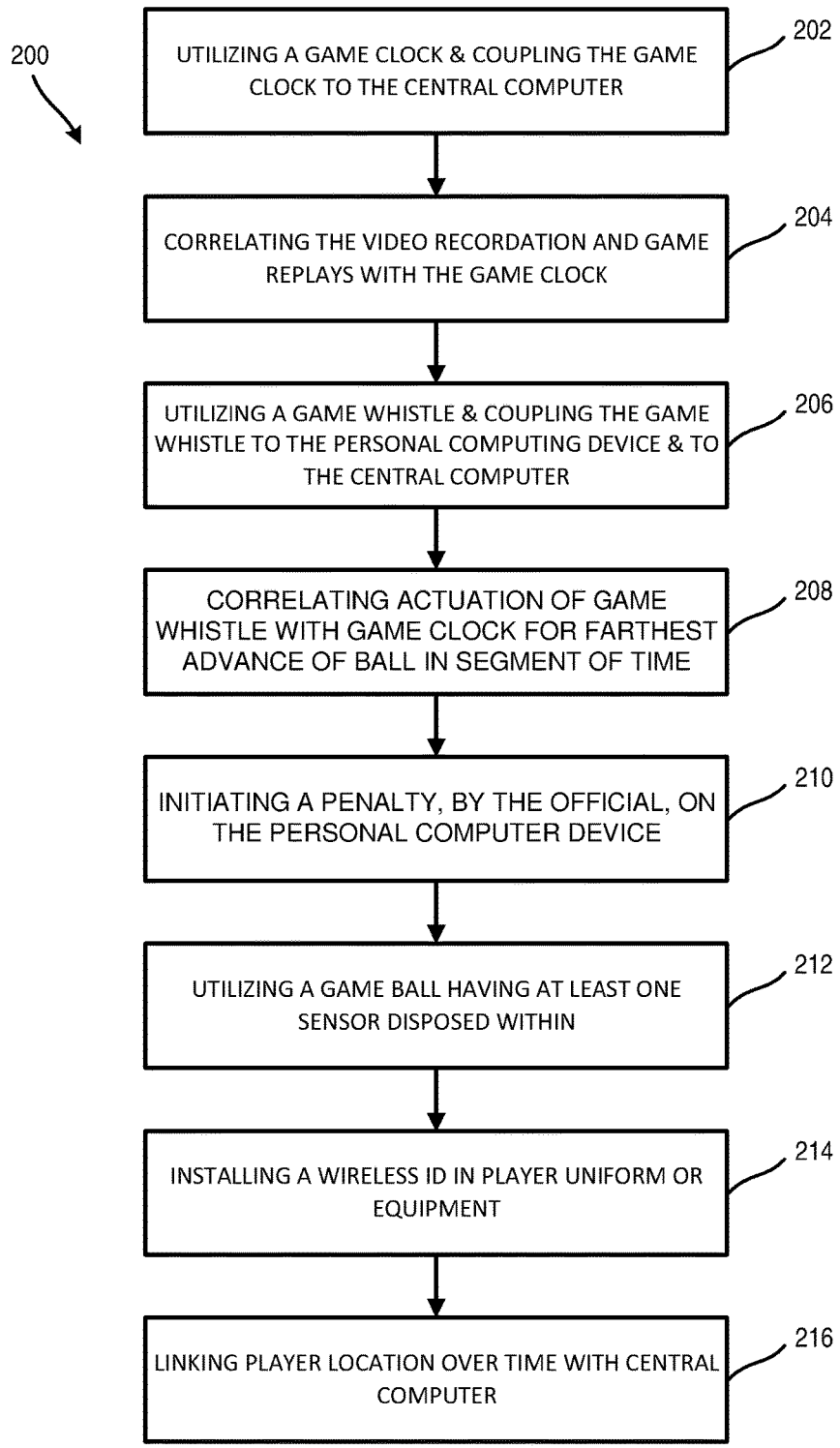
FIG. 2 is a flowchart diagram depicting a method and various method steps to wirelessly gather data from a game ball, players, a referee personal computing device, a game clock, a game whistle, and a game video recordation and replay system in a central computing system, thereby to improve timeliness and accuracy of the athletic competition, according to an embodiment of the technology described herein.

Referring now to FIG. 2, a flowchart diagram 200 depicts a method and various method steps to wirelessly gather data from a game ball, pressure sensors, players, a referee personal computing device, a game clock, a game whistle, and a game video recordation and replay system in a central computing system, thereby to improve timeliness and accuracy of the athletic competition.

The method steps depicted in FIGS. 1 and 2 do not necessarily occur sequentially, and the method steps may vary as determined by a specific sports tracking system implementation. Additionally, not all methods steps listed are required, as may be determined by a test administer. The steps listed are exemplary and may be varied in both order and selection.

Figure 3:
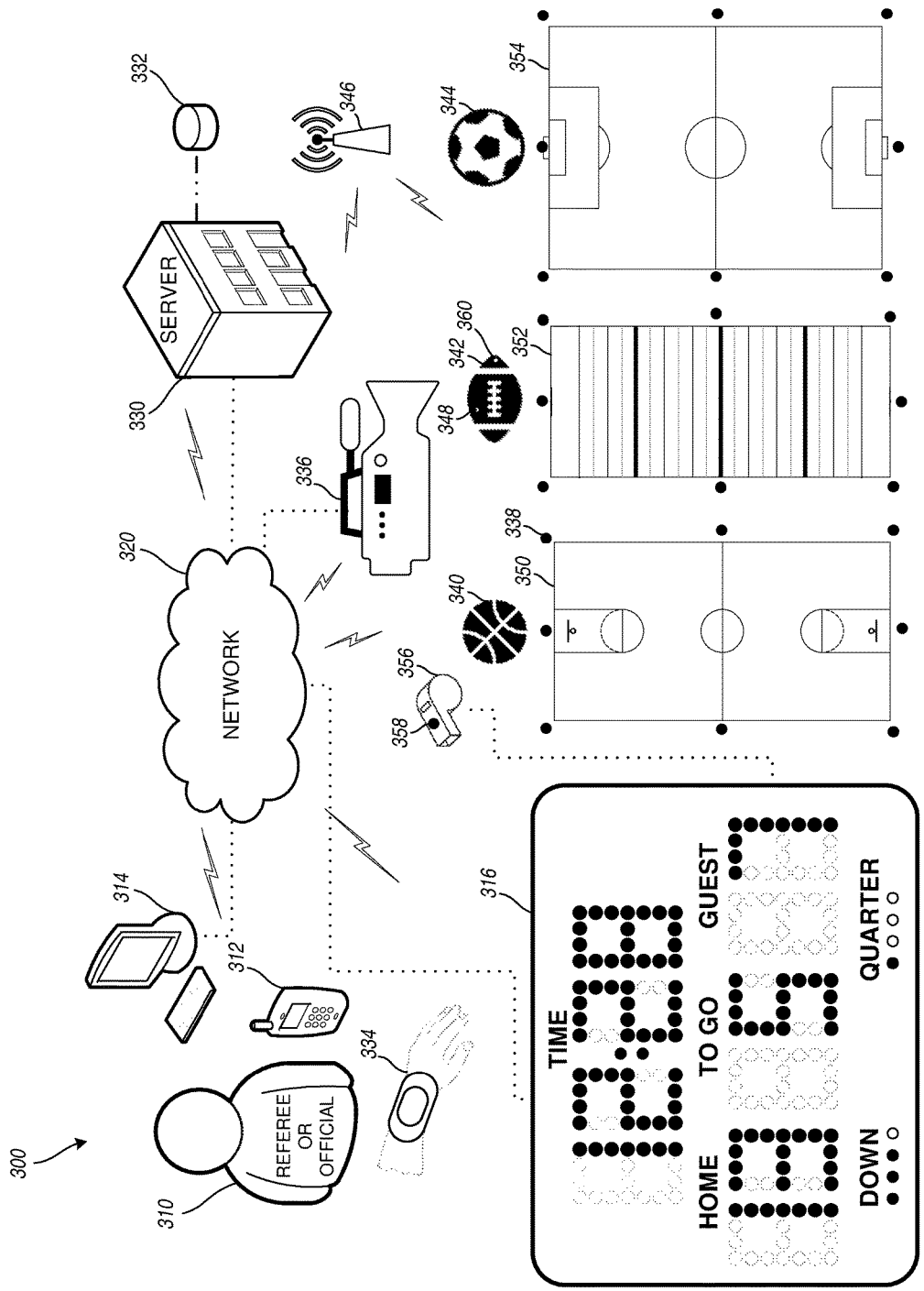
FIG. 3 is a schematic diagram depicting a system to wirelessly gather data from a game ball, players, a referee personal computing device, a game clock, a game whistle, and a game video recordation and replay system in a central computing system, thereby to improve timeliness and accuracy of the athletic competition, according to an embodiment of the technology described herein.

Referring now to FIG. 3, a system 300 to wirelessly gather data from a game ball, pressure sensors (in FIG. 5 specifically), players, a referee personal computing device, a game clock, a game whistle, and a game video recordation and replay system in a central computing system, thereby to improve timeliness and accuracy of the athletic competition.

The system 300 includes a game ball, 340, 342, 344. As depicted, for example, in FIG. 3, the game ball 340, 342, 344 can be a basketball 340 on a basketball court 350, a football 342 on a football field 352, or soccer ball 344 on a soccer field 354, respectively. However, it should be apparent to one of ordinary skill in the art upon reading this disclosure that the "ball" disclosed may be for any sport, game, or athletic competition. Additionally, the "ball" need not be a ball in the literal sense, such as a truly spherical object, but may be any game playing object to be monitored during the course of the game.

The system 300 includes at least one wireless communication system tag 348, as depicted in FIG. 3 with the football 342. The wireless communication system tag 348 is disposed within the game ball 342. The wireless communication system tag 348 is configured to provide the game ball 342 with a unique identification and wirelessly communicable with a receiver, reading device 338. As such, the wireless communication system tag 348 will indicate an exact position of the game ball at all times of the game in X, Y, Z coordinates on the field, such as on a football field 352. The X axis is an axis of advancement down a field of play. The Y axis is an axis of side-to-side location on the field of play. The Z axis is an axis of height of the game ball above a ground level to indicate the exact position relative to an edge of the game ball 342 such that game ball 342 edge locations are identified.

Method step 102 includes utilizing a game ball 342 having at least one wireless ID tag 348.

Method step 104 includes implementing the wireless ID 348 such that exact locations of ends of game ball 342 are identifiable.

Method step 106 includes determining an exact location on playing field where ball resides in X, Y, Z, coordinates.

The system 300 includes a multiplicity of wireless communication system tag reading devices 338. The multiplicity of wireless communication system tag reading devices 338 are placed about a basketball court 350, football field 352, or soccer field 354, or like playing field or court for the game or athletic competition.

The multiplicity of wireless communication system tag reading devices 338 are arranged in decisive areas throughout an area of play for the game, as depicted for example, in FIG. 3 with elements 338, and each configured to sense and read each wireless communication system tag 348.

By way of example, and in at least one embodiment, the multiplicity of wireless communication system tag reading devices 338 are arranged in an array. It is asserted that the most accurate UHF or WIFI assisted systems are accurate to within a few centimeters. This system provides a greater accuracy level. By way of example, on the field, current RFID or WIFI real time location systems (RTLS) can be improved by setting RFID standards in locations such as with elements 338 on the field. The standards set up a physical array which through software can be compared in real-time to the signals from each of the RFID devices on the players or in the ball to allow recalibration in real-time of their exact locations in x, y and z coordinates. For example, prior to each snap, the ball will, at some instant, be almost horizontal to the ground so that the z axis is recalibrated to the standards around it. The same is true of the RFID sensors on each foot of an athlete. Also, in real-time, the software can use the array to compare the standards to the readings from the different RFID sensors which will be able to incorporate slight errors in readings to improve the accuracy of the x, y, and z coordinates. By way of example, the difference in the "z" measurement will vary only slightly over time of an athlete's elbow RFID when he is standing or if he is in a set stance just prior to the snap. But this slight variation will still allow improvement to recalibrate the "Z" measurement in real time. Also in real-time, each reading from each RFID sensor can be recalibrated knowing that their location changes must correspond to the speed and direction which the software has determined that that RFID sensor and the other sensors on that athlete were moving as compared to each other as well as to the standards nearest to them.

The calibration in real-time is also true of the actual barometric pressure which would change over time during a game allowing for different pressure readings in the pressure sensors. However, the pressure sensors, such as any one or more of those depicted in FIG. 5, can either rely on a real-time barometric standard or can be based on changes in pressure. The real-time recalibration will just improve the accuracy of these measurements.

The system 300 includes a computer control center. The computer control center includes at least one server 330, as depicted in FIG. 3. The at least one server 330 is coupled to a network 320 for communication with other devices and systems. The computer control center includes at least one processor. The computer control center includes at least one means for data storage 332. The computer control center is connected to the at least one wireless communication system tag 348 disposed in the game ball 342 and to the plurality of wireless communication system tag reading devices 338. The computer control is configured for receiving, computing, and processing multiplicities of game data and communicating a decisive signal for the exact position for a placement of the game ball 342.

Method step 108 includes utilizing a computer control center 330, processor, and storage 332, and linking the X, Y, Z coordinates over time with computer control center 330.

The system 300 includes a personal computing device 334. The personal computing device 334, in at least one embodiment, is a wristband device worn and maintained by a game official or referee 310 to officiate the game. The personal computing device 334 is connected to a network 320, and/or 346 and to the computer control center 330 for communications and configured both to send and receive data during the game. In various alternative embodiments, the personal computing device is a handheld device 312, or a tablet, PC 314, or like device that is connected to a network 320 and/or 346 and to the computer control center 330 for communications and configured both to send and receive data during the game.

Method step 114 includes utilizing a personal computing device 334, by referee/official 310 wirelessly coupled to the central computer system 330.

Method step 116 includes displaying in the referee personal computing device 334 the exact placement for the ball 342.

In at least one embodiment of the sport tracking system 300, the system 300 includes a game clock 316. The game clock 316 is coupled to the computer control center. The exact position of the game ball 342 at all times of the game in X, Y, Z coordinates is collected over time for the duration of a game and paired to a time on the game clock 316. The exact position is known at a time on the game clock 316 to a level of accuracy at least to hundredths of seconds.

Method step 202 includes utilizing a game clock 316 and coupling the game clock 316 to the computer control center 330.

In at least one embodiment of the sport tracking system 300, the system 300 includes a video camera recordation system 336. The video camera recordation system 336 is coupled to the computer control center 330 and coupled to the game clock 316. The exact position of the game ball 342 at all times of the game in X, Y, Z coordinates is collected over time for the duration of a game and paired to a time on the game clock 316 is also correlated to the appropriate time on the video camera recordation system 336.

Method step 110 includes utilizing game video recordation and coupling the game video recordation to the computer control center 330.

Method step 112 includes correlating X, Y, Z coordinates over time with video over time.

Method step 204 includes correlating the video recordation and game replays with the game clock 316.

In at least one embodiment of the sport tracking system 300, the personal computing device 334 worn and maintained by a game official 310 to officiate the game is also calibrated and synchronized by the computer control center 330 with the game clock 316 and the video camera recordation system 336.

In at least one embodiment of the sport tracking system 300, the personal computing device 334 worn and maintained by a game official 310 to officiate the game further comprises real time location based information such that the computer control center 330 correlates with ball location and the game official adds or subtracts penalties from the personal computing device 334.

In at least one embodiment of the sport tracking system 300, the system 300 includes a game whistle 356. The game whistle 356 is coupled to the computer control center 330 and coupled to the game clock 316. The actuation of the game whistle 356 at a given point in time when a game official 310 makes a call is correlated with the game clock 316 such that the exact time and thereby the exact location of the game ball 342 at that time are known. In at least one embodiment, the game whistle 356 also includes an electronic means 358 to couple to the computer control center 330 and coupled to the game clock 316, such as for example, wireless access.

Method step 206 includes utilizing a game whistle 356 and coupling the game whistle 356 to the personal computing device 334 worn and maintained by a game official 310 and to the computer control center 330.

Method step 208 includes correlating actuation of the game whistle 356 with the game clock 316, for example, to determine the farthest distance or advance of a game ball 342 in a certain segment of time.

Method step 210 includes initiating a penalty by the official 310 on the personal computer device 334.

In at least one embodiment of the sport tracking system 300, the system 300 includes at least one wireless communication player tag disposed upon an apparel or headwear item of a game player at a specific predetermined point. The player tag is in communication with the network 320 and/or 346, the computer control center 330, similar to the tag 342 in the ball 348. As such the player tag provides the real-time location date of that predetermined point during the game to provide that point with a unique identification and wirelessly communicable with the receiver, reading device 338 to indicate an exact position of the predetermined point at all times of the game in X, Y, Z coordinates, with X an axis of advancement down a field of play, with Y an axis of side-to-side location on the field of play, and with Z an axis of height above a ground level.

Method step 214 includes installing a wireless ID in a player uniform or player equipment. This can also include installing a pressure sensor upon a player and player apparel and gear.

Method step 216 includes linking player location over time with the computer control center 330.

In at least one embodiment of the sport tracking system 300, the system 300 includes a sensor 360. The sensor 360 is disposed within the game ball 342 to provide at least one qualitative or quantitative assessment in regard to one or more attributes of the game ball 342.

Method step 212 includes utilizing a game ball 342 having at least one sensor 360 disposed within.

In at least one embodiment of the sport tracking system 300, the sensor 360 is a pressure sensor that in real-time continuously monitors the pressure of the game ball 342.

In at least one embodiment of the sport tracking system 300, the sensor 360 is a velocity and direction sensor that in real-time continuously monitors the velocity and direction of the game ball 342 and tracks changes to velocity and direction.

In at least one embodiment of the sport tracking system 300, the at least one wireless communication system tag 348 or player tag is RFID.

In at least one embodiment of the sport tracking system 300, the at least one wireless communication system tag 348 or player tag is Wi-Fi.

In at least one embodiment of the sport tracking system 300, the at least one wireless communication system tag 348 or player tag is ultra-wideband (UWB).

The system 300 includes at least one pressure sensor 512, for example, disposed upon a player of the game. The at least one pressure sensor 512 disposed upon a player of the game is configured to send a signal of a sudden pressure change, thereby to indicate an impact of a portion of the player or player equipment with the ground or another player.

In at least one embodiment, the pressure sensor 512, for example, is a piezo transducer.

The pressure sensors, 512, for example, send a signal of sudden pressure change such as when the limb hits the ground. The pressure sensors are correlated with the software signals of the x, y, z coordinates of the player's RFID signal as well as that of the ball. The logic of the computer software determines the instant that the player first touched that limb to the ground. In cases where the limb hit a part of another player instead, the x, y, z coordinates (especially the z coordinate) would determine that the limb was not in contact with the ground. This second system would be a double check for accuracy of the software. In at least one embodiment, the pressure sensor data is coupled to the game clock.

Sensors also in shoes such as would allow exact dimensions as well as outline of shoe and top of toes so as to know when the toe or heel touched ground as well as x, y, z coordinates of the foot at all times. This is useful in determining exactly where a foot went out of bounds as well as if the toe or heel portion touched after catching a football, or soccer, basketball, or like game device in another sport. The use of sensors in helmets and shoulder pads aids in determining if targeting by hitting with helmet before shoulders.

In at least one embodiment of the sport tracking system, the at least one pressure sensor 508, 510 disposed upon a player of the game is disposed on a player helmet.

In at least one embodiment of the sport tracking system, the at least one pressure sensor 520, 522, 524, 526 disposed upon a player of the game is disposed on a player shoe.

In at least one embodiment of the sport tracking system, the at least one pressure sensor 504, 506 disposed upon a player of the game is disposed on a player knee.

In at least one embodiment of the sport tracking system, the at least one pressure sensor 502 disposed upon a player of the game is disposed on a player butt.

In at least one embodiment of the sport tracking system, the at least one pressure sensor 528 disposed upon a player of the game is disposed on a player back.

In at least one embodiment of the sport tracking system, the at least one pressure sensor 516, 518 disposed upon a player of the game is disposed on a player elbow.

In at least one embodiment of the sport tracking system, the at least one pressure sensor 512, 514 disposed upon a player of the game is disposed on a player shoulder.

Figure 5:
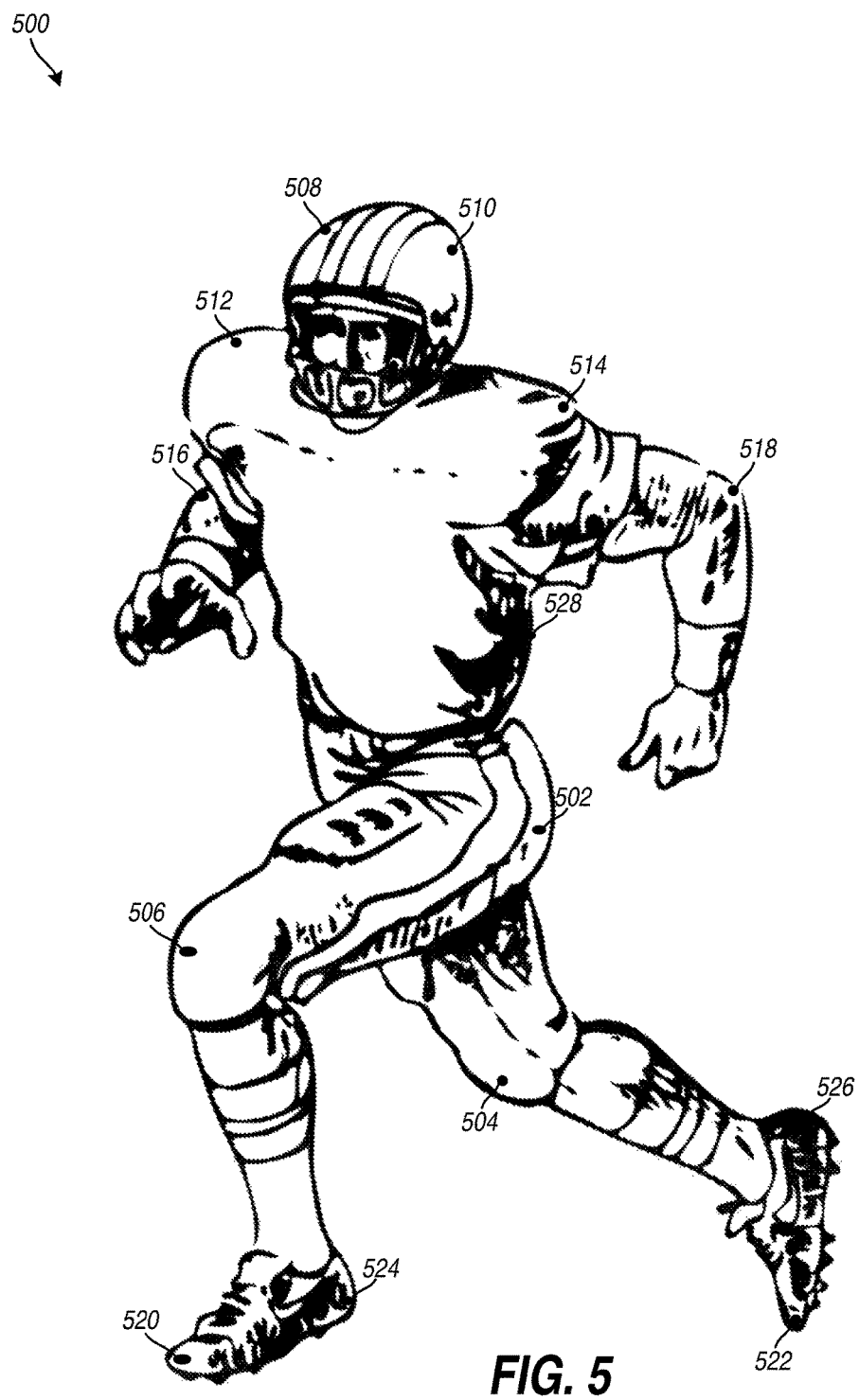
FIG. 5 is a schematic diagram depicting a plurality of pressure sensors placed upon a player at the helmet, shoulder pads, elbows, knees, and shoes, thereby to detect instantaneous pressure change, impact, and location according to an embodiment of the technology described herein.

In at least one embodiment of the sport tracking system, the at least one pressure sensor further comprises a plurality of sensors disposed upon a player of the game. As depicted in FIG. 5, for example, locations for one or more pressures sensors are depicted on the player, player apparel, and layer gear.

Figure 4:
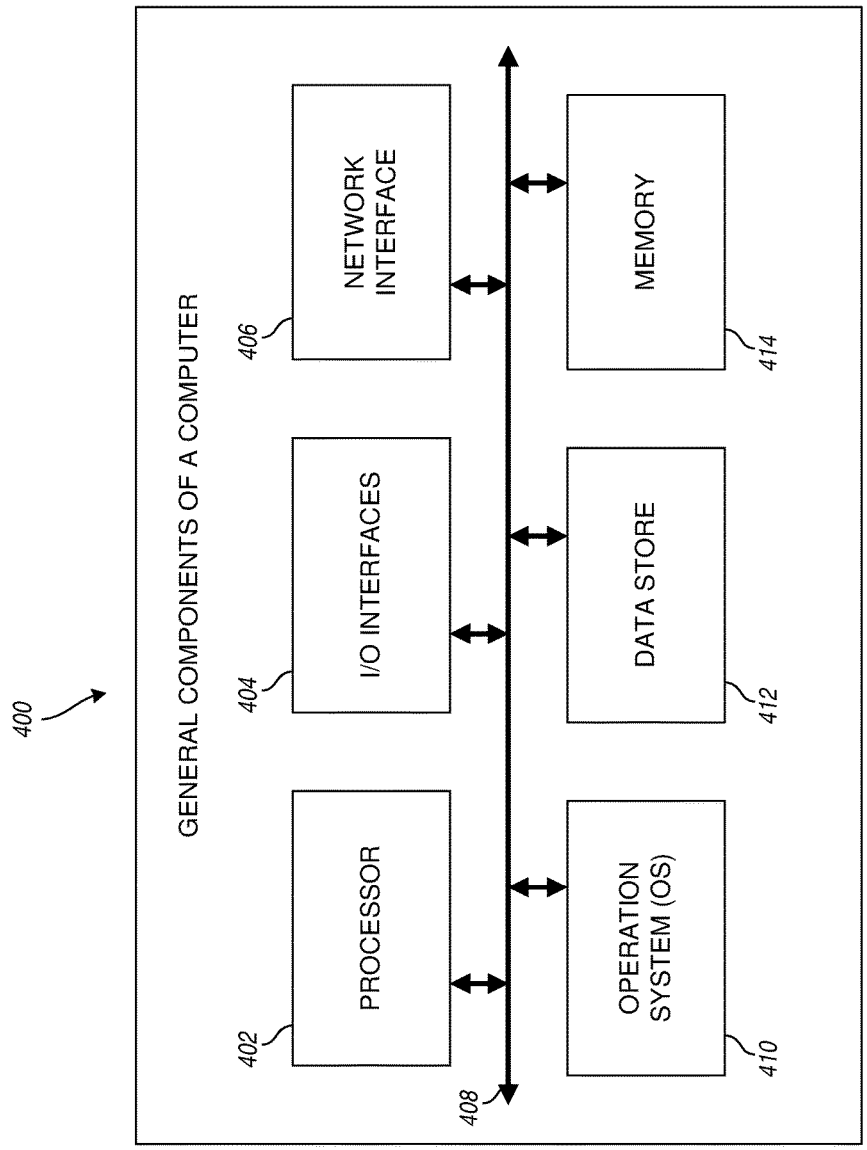
FIG. 4 is a block diagram illustrating the general components of a computer utilized to wirelessly gather data from a game ball, players, a referee personal computing device, a game clock, a game whistle, and a game video recordation and replay system in a central computing system, thereby to improve timeliness and accuracy of the athletic competition, according to an exemplary embodiment of the technology.

Referring now to FIG. 4, a block diagram 400 illustrates the general components of a computer utilized to wirelessly gather data from a game ball, players, a referee personal computing device, a game clock, a game whistle, and a game video recordation and replay system in a central computing system, thereby to improve timeliness and accuracy of the athletic competition.

Any one or more of the computers, servers, database, and the like, disclosed above, may be implemented with such hardware and software components. The computer 400 can be a digital computer that, in terms of hardware architecture, generally includes a processor 402, input/output (I/O) interfaces 404, network interfaces 406, an operating system (O/S) 410, a data store 412, and a memory 414. The components (402, 404, 406, 410, 412, and 414) are communicatively coupled via a local interface 408. The local interface 408 can be, for example but not limited to, one or more buses or other wired or wireless connections, as is known in the art. The local interface 408 can have additional elements, which are omitted for simplicity, such as controllers, buffers (caches), drivers, among many others, to enable communications. Further, the local interface 408 can include address, control, and/or data connections to enable appropriate communications among the aforementioned components. The general operation of a computer comprising these elements is well known in the art.

The processor 402 is a hardware device for executing software instructions. The processor 402 can be any custom made or commercially available processor, a central processing unit (CPU), an auxiliary processor among several processors associated with the computer 400, a semiconductor-based microprocessor (in the form of a microchip or chip set), or generally any device for executing software instructions. When the computer 400 is in operation, the processor 402 is configured to execute software stored within the memory 414, to communicate data to and from the memory 414, and to generally control operations of the computer 400 pursuant to the software instructions.

The I/O interfaces 404 can be used to receive user input from and/or for providing system output to one or more devices or components. User input can be provided via, for example, a keyboard and/or a mouse. System output can be provided via a display device and a printer (not shown). I/O interfaces 404 can include, for example but not limited to, a serial port, a parallel port, a small computer system interface (SCSI), an infrared (IR) interface, a radio frequency (RF) interface, and/or a universal serial bus (USB) interface.

The network interfaces 406 can be used to enable the computer 400 to communicate on a network. For example, the computer 400 can utilize the network interfaces 408 to communicate via the internet to other computers or servers for software updates, technical support, etc. The network interfaces 408 can include, for example, an Ethernet card (e.g., 10BaseT, Fast Ethernet, Gigabit Ethernet) or a wireless local area network (WLAN) card (e.g., 802.11a/b/g). The network interfaces 408 can include address, control, and/or data connections to enable appropriate communications on the network.

A data store 412 can be used to store data, such as information regarding positions entered in a requisition. The data store 412 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 412 can incorporate electronic, magnetic, optical, and/or other types of storage media. In one example, the data store 412 can be located internal to the computer 400 such as, for example, an internal hard drive connected to the local interface 408 in the computer 400. Additionally in another embodiment, the data store can be located external to the computer 400 such as, for example, an external hard drive connected to the I/O interfaces 404 (e.g., SCSI or USB connection). Finally in a third embodiment, the data store may be connected to the computer 400 through a network, such as, for example, a network attached file server.

The memory 414 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 414 may incorporate electronic, magnetic, optical, and/or other types of storage media. Note that the memory 414 can have a distributed architecture, where various components are situated remotely from one another, but can be accessed by the processor 402.

The software in memory 414 can include one or more software programs, each of which includes an ordered listing of executable instructions for implementing logical functions. In the example of FIG. 4, the software in the memory system 414 includes the interactive toolkit for sourcing valuation and a suitable operating system (O/S) 410. The operating system 410 essentially controls the execution of other computer programs, such as the interactive toolkit for sourcing valuation, and provides scheduling, input-output control, file and data management, memory management, and communication control and related services. The operating system 410 can be any of Windows NT, Windows 2000, Windows XP, Windows Vista, Windows 7, 8, 10 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or other like operating system with similar functionality.

In an exemplary embodiment of the technology described herein, the computer 400 is configured to perform flowcharts 100 and 200 depicted in FIGS. 1 and 2 respectively.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A sport tracking system for tracking and monitoring movement of a game ball in play in a sport game and wirelessly gathering data from the game ball and from other game device elements, game players, and game officials, to improve timeliness and accuracy of the athletic competition, the system comprising:

a game ball;

at least one wireless communication system tag disposed within the game ball to provide the game ball with a unique identification and wirelessly communicable with a receiver, reading device to indicate an exact position of the game ball at all times of the game in X, Y, Z coordinates, with X an axis of advancement down a field of play, with Y an axis of side-to-side location on the field of play, and with Z an axis of height of the game ball above a ground level, and to indicate the exact position relative to an edge of the game ball such that game ball edge locations are identified;

a plurality of wireless communication system tag reading devices arranged in an array with real time location in decisive areas throughout an area of play for the game, and each configured to sense and read each wireless communication system tag;

at least one wireless communication player tag, electronically coupled to the computer control center over the network, and disposed upon an apparel or headwear item of a game player at a specific predetermined point to provide the real-time location data of that predetermined point during the game to provide that predetermined point with a unique identification and wirelessly communicable with the receiver, reading device to indicate an exact position of the predetermined point at all times of the game in X, Y, Z coordinates, with X an axis of advancement down a field of play, with Y an axis of side-to-side location on the field of play, and with Z an axis of height above a ground level;

wherein the at least one wireless communication player tag links the game player location over time with the computer control center;

at least one pressure sensor disposed upon a player of the game and configured to send a signal of a sudden pressure change, thereby to indicate an impact of a portion of the player or player equipment with the ground or another player;

a computer control center on a network and having at least one server and at least one processor, and at least one means for data storage, and connected to the at least one wireless communication system tag disposed in the game ball, to the at least one wireless communication player tag, to the at least one pressure sensor disposed upon a player of the game, and to the plurality of wireless communication system tag reading devices, and configured for receiving, computing, and processing a plurality of game data from the game ball and the at least one wireless communication player tag and the at least one pressure sensor and communicating a decisive signal for the exact position for a placement of the game ball based on the collected, processed game data from the game ball, the at least one pressure sensor, and the at least one player tag;

a personal computing device with display worn and maintained by a game official to officiate the game, wherein the personal computing device is connected to the computer control center for communications and configured both to send and receive data during the game and to display in the personal computing device game updates and ball placement locations as determined by the computer control center to provide for the exact placement for the ball to resume play; and a game clock coupled to the computer control center;

wherein the exact position of the game ball at all times of the game in X, Y, Z coordinates is collected over time for the duration of a game and paired to a time on the game clock.

2. The sport tracking system of claim 1 wherein the exact position is known at a time on the game clock to a level of accuracy at least to hundredths of seconds.

3. The sport tracking system of claim 2, further comprising:

a video camera recordation system coupled to the computer control center and coupled to the game clock; and wherein the exact position of the game ball at all times of the game in X, Y, Z coordinates is collected over time for the duration of a game and paired to a time on the game clock is also correlated to the appropriate time on the video camera recordation system.

4. The sport tracking system of claim 3, wherein the personal computing device worn and maintained by the game official to officiate the game is also calibrated and synchronized by the computer control center with the game clock and the video camera recordation system.

5. The sport tracking system of claim 1, wherein the personal computing device worn and maintained by the game official to officiate the game further comprises real time location based information such that the computer control center correlates with ball location and the game official adds or subtracts penalties from the personal computing device.

6. The sport tracking system of claim 2, further comprising:

a game whistle coupled to the computer control center and coupled to the game clock;

wherein the actuation of the game whistle at a given point in time when a game official makes a call is correlated with the game clock such that the exact time and thereby the exact location of the game ball at that time are known.

7. The sport tracking system of claim 1, wherein the at least one pressure sensor disposed upon a player of the game is disposed on a player helmet.

8. The sport tracking system of claim 1, wherein the at least one pressure sensor disposed upon a player of the game is disposed on a player shoe.

9. The sport tracking system of claim 1, wherein the at least one pressure sensor disposed upon a player of the game is disposed on a player knee.

10. The sport tracking system of claim 1, wherein the at least one pressure sensor disposed upon a player of the game is disposed on a player butt.

11. The sport tracking system of claim 1, wherein the at least one pressure sensor disposed upon a player of the game is disposed on a player back.

12. The sport tracking system of claim 1, wherein the at least one pressure sensor disposed upon a player of the game is disposed on a player elbow.

13. The sport tracking system of claim 1, wherein the at least one pressure sensor disposed upon a player of the game is disposed on a player shoulder.

14. The sport tracking system of claim 1, wherein the at least one pressure sensor further comprises a plurality of sensors disposed upon a player of the game.

15. The sport tracking system of claim 1, wherein the at least one wireless communication system tag is RFID.

16. The sport tracking system of claim 1, wherein the at least one wireless communication system tag is Wi-Fi.

17. The sport tracking system of claim 1, wherein the at least one wireless communication system tag is ultra-wideband (UWB).

18. A sport tracking method for tracking and monitoring movement of a game ball in play in a sport game and wirelessly gathering data from the game ball and from other game device elements, game players, and game officials, to improve timeliness and accuracy of the athletic competition, the method comprising:
  utilizing a game ball;
  utilizing at least one wireless communication system tag disposed within the game ball to provide the game ball with a unique identification and wirelessly communicable with a receiver, reading device to indicate an exact position of the game ball at all times of the game in X, Y, Z coordinates, with X an axis of advancement down a field of play, with Y an axis of side-to-side location on the field of play, and with Z an axis of height of the game ball above a ground level, and to indicate the exact position relative to an edge of the game ball such that game ball edge locations are identified;
  utilizing at least one wireless communication player tag, electronically coupled to the computer control center over the network, and disposed upon an apparel or headwear item of a game player at a specific predetermined point to provide the real-time location data of that predetermined point during the game to provide that predetermined point with a unique identification and wirelessly communicable with the receiver, reading device to indicate an exact position of the predetermined point at all times of the game in X, Y, Z coordinates, with X anaxis of advancement down a field of play, with Y an axis of side-to-side location on the field of play, and with Z an axis of height above a ground level;
  wherein the at least one wireless communication player tag links the game player location over time with the computer control center;
  utilizing at least one pressure sensor disposed upon a player of the game and configured to send a signal of a sudden pressure change, thereby to indicate an impact of a portion of the player or player equipment with the ground or another player;
  utilizing a plurality of wireless communication system tag reading devices arranged in in an array with real time location in decisive areas throughout an area of play for the game, and each configured to sense and read each wireless communication system tag;
  utilizing a computer control center on a network and having at least one server and at least one processor, and at least one means for data storage, and connected to the at least one wireless communication system tag disposed in the game ball, to the at least one wireless communication player tag, to the at least one pressure sensor disposed upon a player of the game, and to the plurality of wireless communication system tag reading devices, and configured for receiving, computing, and processing a plurality of game data from the game ball and the at least one wireless communication player tag and the at least one pressure sensor and communicating a decisive signal for the exact position for a placement of the game ball based on the collected, processed game data from the game ball, the at least one pressure sensor, and the at least one player tag;
  utilizing a personal computing device worn and maintained by a game official to officiate the game, wherein the personal computing device is connected to the computer control center for communications and configured both to send and receive data during the game;
  implementing the wireless communication system tag such that the exact location of the ends of the game ball are identifiable and the X, Y, Z coordinates;
  determining an exact location on a game playing area where the game ball resides in X, Y, Z coordinates;
  utilizing the computer control center to link X, Y, Z coordinates over time;
  displaying in the personal computing device with display worn and maintained by a game official game updates, ball placement locations, as determined by the computer control center and displaying in the personal computing device game updates and ball placement locations as determined by the computer control center to provide for the exact placement for the ball to resume play; and
  utilizing a game clock coupled to the computer control center;
  wherein the exact position of the game ball at all times of the game in X, Y, Z coordinates is collected over time for the duration of a game and paired to a time on the game clock.

19. The sport tracking method of claim 18, further comprising:
  wherein the exact position is known at a time on the game clock to a level of accuracy at least to hundredths of seconds; and
  correlating the exact position of the game ball at all times of the game in X, Y, Z coordinates over time of the game clock.

20. The sport tracking method of claim 19, further comprising:
  utilizing a video camera recordation system coupled to the computer control center and coupled to the game clock; and
  wherein the exact position of the game ball at all times of the game in X, Y, Z coordinates is collected over time for the duration of a game and paired to a time on the game clock is also correlated to the appropriate time on the video camera recordation system; and
  correlating the video camera recordation system and game replays with the game clock.

* * * * *